(12) United States Patent
Segi (10) Patent No.: US 10,926,437 B2
(45) Date of Patent: Feb. 23, 2021

(54) MOLDED ARTICLE AND MANUFACTURING METHOD THEREOF

(71) Applicant: TOYOTA SHATAI KABUSHIKI KAISHA, Kariya (JP)

(72) Inventor: Makoto Segi, Kariya (JP)

(73) Assignee: TOYOTA SHATAI KABUSHIKI KAISHA, Kariya (JP)

( * ) Notice: Subject to any disclaimer, the term of this patent is extended or adjusted under 35 U.S.C. 154(b) by 0 days.

(21) Appl. No.: 16/282,099

(22) Filed: Feb. 21, 2019

(65) Prior Publication Data

US 2019/0283292 A1 Sep. 19, 2019

(30) Foreign Application Priority Data

Mar. 13, 2018 (JP) .............................. JP2018-045663

(51) Int. Cl.

| B65D 1/34 | (2006.01) |
|---|---|
| B65D 1/48 | (2006.01) |
| B32B 3/18 | (2006.01) |
| B32B 21/08 | (2006.01) |
| B29C 45/14 | (2006.01) |
| B29K 711/14 | (2006.01) |
| B29L 31/00 | (2006.01) |

(52) U.S. Cl.
CPC .. B29C 45/14065 (2013.01); B29C 45/14311 (2013.01); B29C 45/14336 (2013.01); *B29C 2045/14327* (2013.01); *B29K 2711/14* (2013.01); *B29L 2031/7146* (2013.01)

(58) Field of Classification Search
CPC ......... B29K 2711/14; B29L 2031/7146; Y10T 428/24612; Y10T 428/2457; B65D 9/32; B65D 1/34; B65D 1/48; B32B 3/18; B32B 21/08; B29C 45/14065
USPC .................................. 429/100; 220/645, 528
See application file for complete search history.

(56) References Cited

U.S. PATENT DOCUMENTS

| 3,653,973 | A | * | 4/1972 | Broglid | .................. H01M 6/38 |
|---|---|---|---|---|---|
| | | | | | 429/116 |
| 4,359,168 | A | | 11/1982 | Triadu | |
| 4,489,512 | A | * | 12/1984 | Schovee | .................. A47G 1/06 |
| | | | | | 156/73.1 |
| 6,913,666 | B1 | * | 7/2005 | Aeschlimann | .......... B29C 65/56 |
| | | | | | 156/73.1 |
| 2013/0252059 | A1 | * | 9/2013 | Choi | ...................... B29C 70/20 |
| | | | | | 429/100 |

FOREIGN PATENT DOCUMENTS

| DE | 38 05 314 A1 | 8/1989 |
|---|---|---|
| EP | 0 022 043 A1 | 1/1981 |
| JP | 2008-001339 A | 1/2008 |
| JP | 2015-157431 A | 9/2015 |
| WO | WO 2011/057662 A1 | 5/2011 |

* cited by examiner

*Primary Examiner* — Joanna Pleszcynska
(74) *Attorney, Agent, or Firm* — Christensen, Fonder, Dardi & Herbert PLLC (57) ABSTRACT

A molded article may include a composite wall portion that is composed of a resin substrate and a wood insert embedded in the resin substrate. The wood insert is integrated with the resin substrate in a boundary portion defined as a joining portion of an end surface of the wood insert and an end surface of the resin substrate with its inner and outer surfaces substantially exposed on inner and outer surfaces of the composite wall portion.

15 Claims, 8 Drawing Sheets

MOLDED ARTICLE AND MANUFACTURING METHOD THEREOF

BACKGROUND

The present disclosure relates to a molded article and a manufacturing method of the molded article. More particularly, the present disclosure relates to a composite molded article having a composite wall portion that is composed of a resin substrate and a wood insert embedded in the resin substrate, and a manufacturing method of the composite molded article.

Such a composite molded article is taught, for example, by JP2008-1339A and JP2015-157431A. The molded article taught by JP2008-1339A is directed to a resin platform or pallet of a hand truck. The resin pallet is reinforced by reinforcement members embedded therein. The resin pallet reinforced by the reinforced members may preferably be formed by insert molding (injection molding). Further, wood members may be used as the reinforcement members in order to reduce a weight of the resin pallet. In such a case, when the wood members are embedded in the resin pallet by insert molding, the wood members embedded in the resin substrate may be compressed due to an injection pressure of a molding material (resin), so as to be decreased in bulk. As a result, the manufactured resin pallet may be increased in weight because the molding material may be increased in volume by an amount corresponding to a decrease of the wood members in bulk. This may increase the weight of the resin pallet.

Conversely, the molded article taught by JP2015-157431A is directed to a composite vehicular interior part. The interior part has a laminated structure in which a wood sheet layer is combined with a synthetic resin substrate layer. Such an interior part may be formed by insert molding (injection molding). However, when the interior part is formed by insert molding, the wood sheet layer may be compressed due to an injection pressure of a molding material (resin) of the substrate layer, so as to be decreased in bulk (i.e., thinned and densified). As a result, the manufactured interior part may be increased in weight because the molding material may be increased in volume by an amount corresponding to a decrease of the wood sheet layer. Further, the compressed and thinned wood sheet layer tends to be deformed or warped, so as to be decreased in strength (rigidity) and appearance. As a result, the manufactured composite interior party may be decreased in strength and appearance.

Thus, there is a need in the art to provide an improved composite molded article, and a manufacturing method of the composite molded article.

SUMMARY

For example, in one aspect of the present disclosure, a molded article may include a composite wall portion that is composed of a resin substrate and a wood insert embedded in the resin substrate. The wood insert is integrated with the resin substrate in a boundary portion defined as a joining portion of an end surface of the wood insert and an end surface of the resin substrate with its inner and outer surfaces substantially exposed on inner and outer surfaces of the composite wall portion. Optionally, the resin substrate may have a plurality of ribs that are configured to extend along the wood insert beyond the boundary portion at the inner surface of the composite wall portion.

According to the aspect, the wood insert is integrated with the resin substrate in the boundary portion formed between the end surface of the wood insert and the end surface of the resin substrate with its upper and lower surfaces substantially exposed on both surfaces of the composite wall portion. Therefore, the wood insert is securely connected to the resin substrate with a substantial connecting strength. Further, the composite wall portion (the molded article) may have a good appearance. Further, the composite wall portion (the molded article) may be reduced in weight due to the embedded wood insert because the wood insert is smaller than the resin substrate in specific gravity. Further, the plurality of ribs may function to reinforce the composite wall portion. This may lead to increased rigidity of the composite wall portion.

In another aspect of the present disclosure, a manufacturing method of a molded article having a composite wall portion that is composed of a resin substrate and a wood insert embedded in the resin substrate is provided. The method may include the steps of providing a molding die unit having a first die and a second die, attaching the wood insert to the first die in a condition in which the molding die unit is opened, closing the molding die unit in order to form a molding cavity having a first cavity portion in which the resin substrate is molded and a second cavity portion in which the wood insert is previously positioned, and injecting a molding material into the first cavity portion, so as to mold the resin substrate and to combine the molded resin substrate with the wood insert in a cavity boundary corresponding to an end surface of the wood insert. A ratio of a thickness of the wood insert in its peripheral portion to a predetermined thickness of the resin substrate to be molded in its peripheral portion is determined to a range of not less than 0.8 or more.

According to the aspect, the molding material injected into the first cavity portion may substantially be prevented from entering the second cavity portion, i.e., prevented from wrapping around the wood insert positioned in the second cavity portion, during molding. Therefore, the method may produce the molded article in which the wood insert is integrated with the resin substrate in a boundary portion formed between the end surface of the wood insert and the end surface of the resin substrate with its upper and lower surfaces substantially exposed on both surfaces of the composite wall portion. Further, the wood insert may be prevented from being compressed by the molding material.

Other objects, features and advantages of the present disclosure will be readily understood after reading the following detailed description together with the accompanying drawings and the claims.

DETAILED DESCRIPTION

In the following, a molded article according to a representative embodiment of the present disclosure and a manufacturing method thereof will be described with reference to FIGS. 1 to 9.

In this embodiment, a battery tray 2 (FIGS. 1 to 4) on which a battery VT is positioned is exemplified as the molded article. Further, forward and backward, rightward and leftward, and upward and downward in the drawings may respectively correspond to forward and backward, rightward and leftward, and upward and downward of a vehicle to which the battery tray 2 is attached. Further, a longitudinal (front-back) direction, a vertical direction and a lateral direction in the description may respectively referred to as a longitudinal (front-back) direction, a vertical direction and a lateral direction of the vehicle or the battery tray 2.

<Battery Tray>

Figure 1:
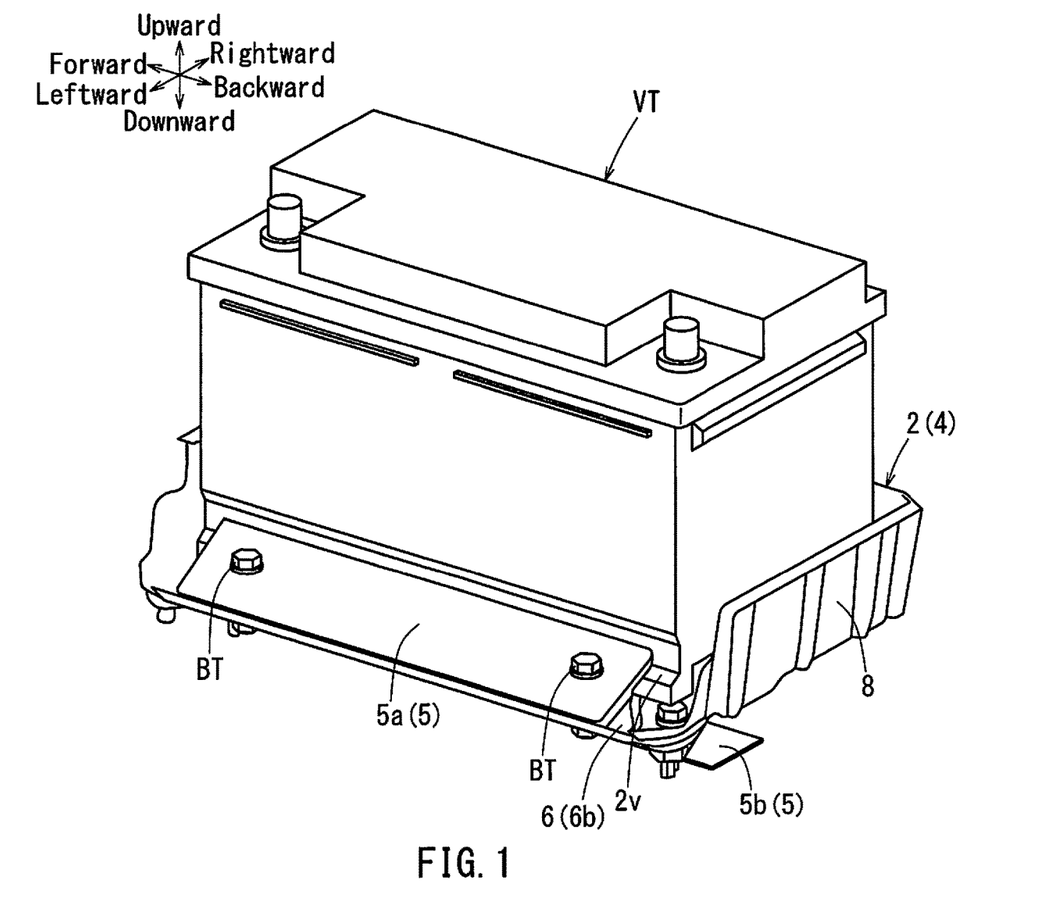
FIG. 1 is a perspective view of a battery tray (molded article) according to a representative embodiment of the present disclosure, in which a battery is positioned thereon.

Generally, the battery tray 2 may be positioned in an engine compartment, a space under a seat, a luggage storage area, a space under a front side step or other such spaces. Further, as shown in FIG. 1, the battery VT to be positioned on the battery tray 2 may be a rectangular parallelepiped heavy device having four (right and left, front and rear) elongated flanged portions formed in four lower peripheries (only the left flanged portion 2v is shown for simplification). The battery VT positioned on the battery tray 2 may be secured to the battery tray 2 via a fixture mechanism 5, so as to be integrated with the battery tray 2.

Figure 2:
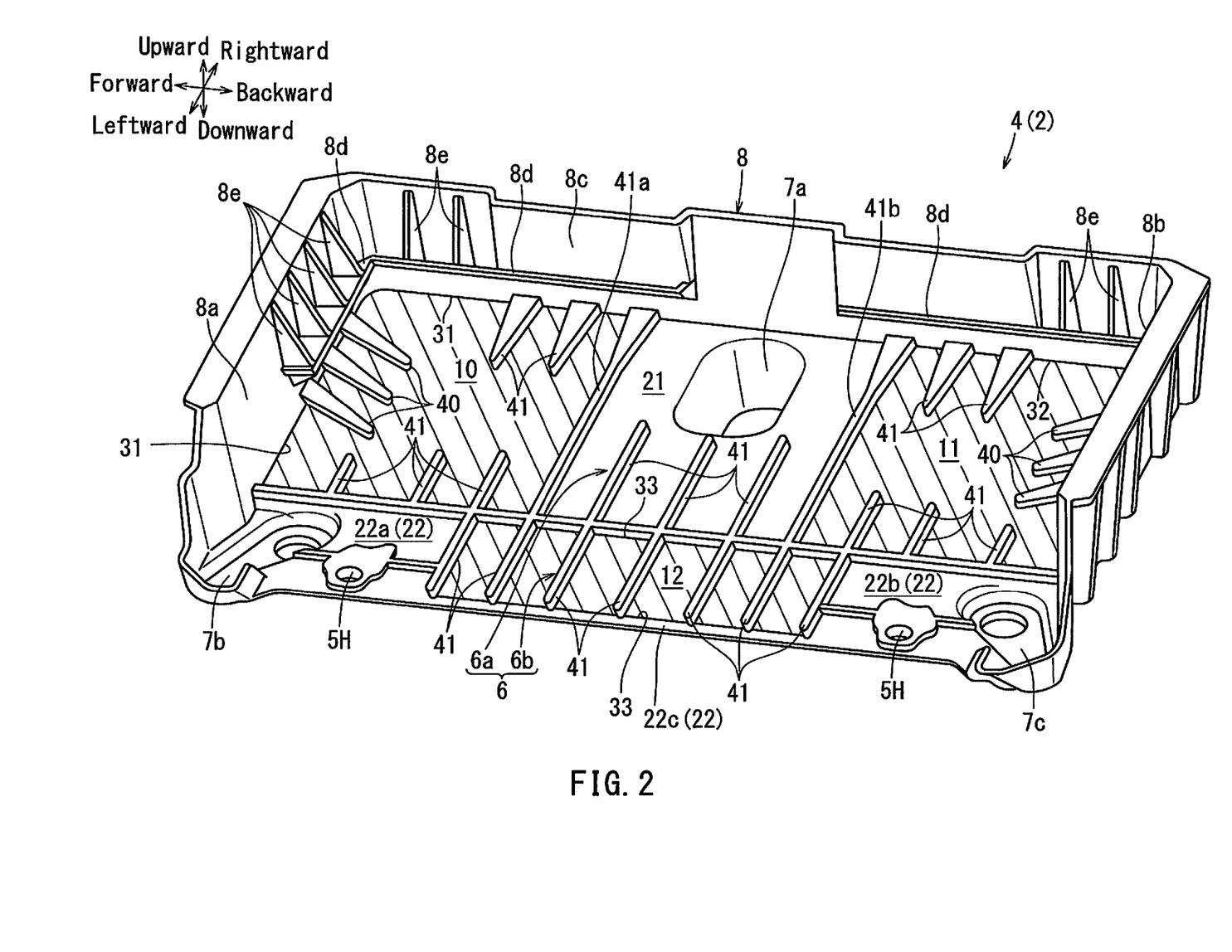
FIG. 2 is a perspective view of the battery tray.
Figure 3:
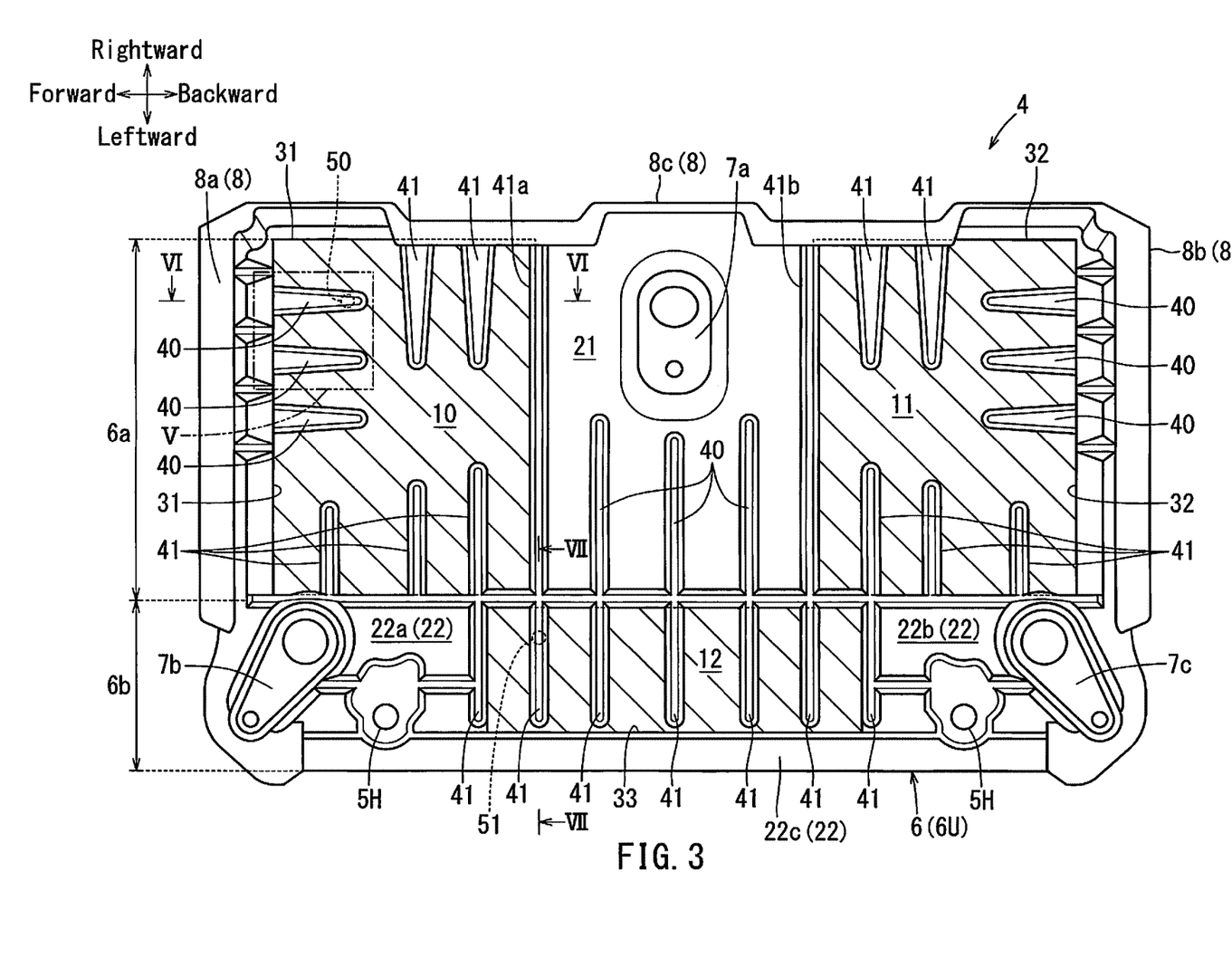
FIG. 3 is a plan view of the battery tray.
Figure 4:
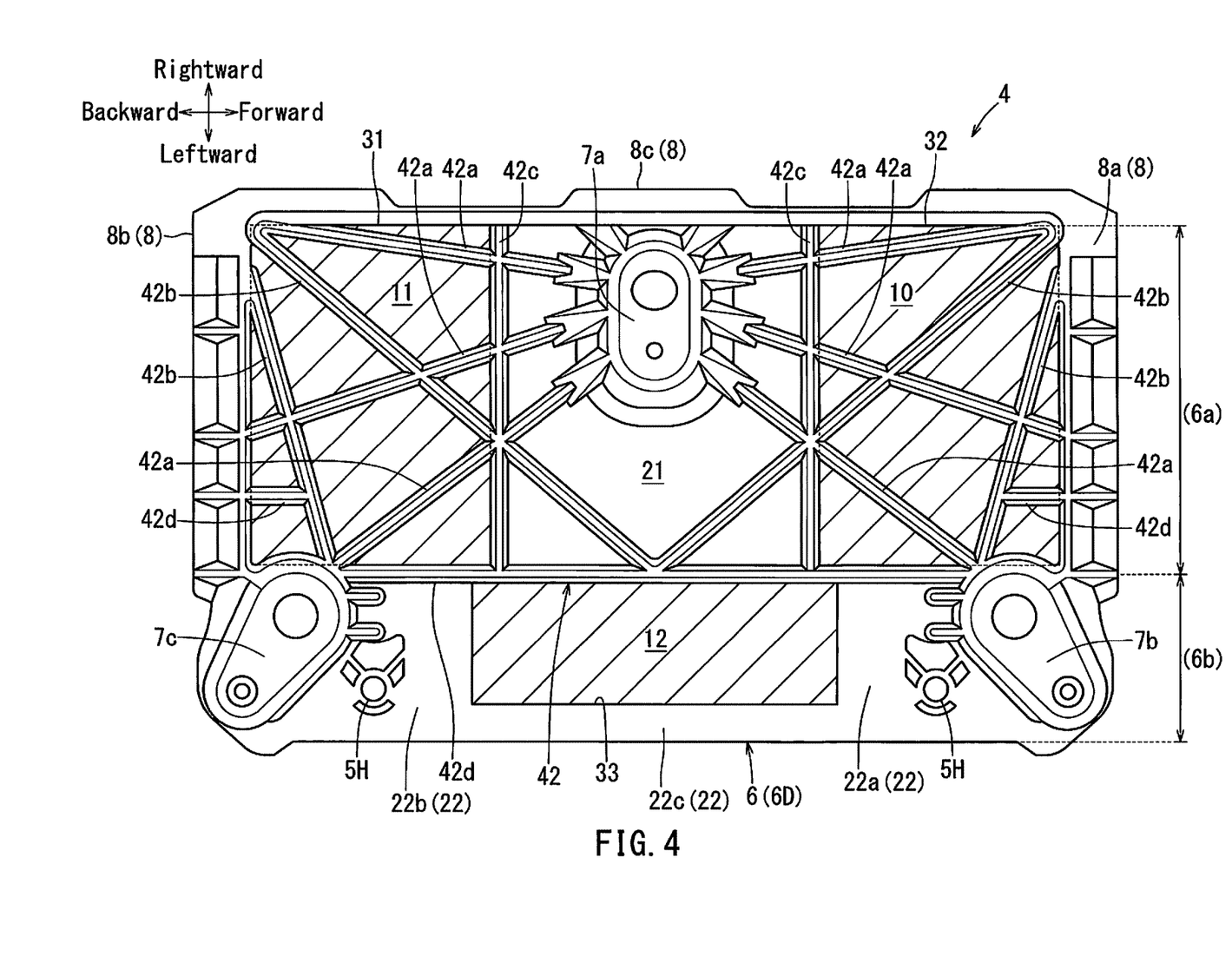
FIG. 4 is a bottom view of the battery tray.

As shown in FIG. 2, the battery tray 2 may have a rectangular open-sided tray main body 4. The tray main body 4 may be composed of a resin substrate and a wood insert embedded in the resin substrate in order to reduce in weight and to increase in strength and rigidity. That is, the tray main body 4 may be composed of the resin substrate of which a portion is replaced with the wood insert. The resin substrate may include horizontal substrate portions 21 and 22 and a vertical substrate portion 8. Conversely, the wood insert may include wood members 10, 11 and 12. In particular, the horizontal substrate portions 21 and 22 (the resin substrate) and the embedded wood members 10, 11 and 12 (the wood insert) may constitute a plate-shaped tray bottom portion 6. The tray bottom portion 6 may be referred to as a (resin-wood) composite wall portion. Further, as shown in FIGS. 3 and 4, the wood members 10, 11 and 12 may preferably be embedded in the horizontal substrate portions 21 and 22 in such a way that their upper and lower (inner and outer) surfaces may be exposed on both surfaces (i.e., an upper or inner surface 6U and a lower or outer surface 6D) of the tray bottom portion 6. Conversely, the vertical substrate portion 8 (the resin substrate) may extend along a front and back sides and a right side of the tray bottom portion 6, so as to form a tray wall portion. Therefore, the vertical substrate portion 8 may be herein after referred to as the tray wall portion 8. Further, the tray wall portion 8 may be referred to as a (resin) solid wall portion.

<Tray Main Body>

The tray main body 4 may be formed by insert molding (injection molding) using various resins. Examples of the resins are a polypropylene resin, a polyethylene resin, ABS resin, a polycarbonate resin, a polyester resin, a polyamide resin, a polyacetal resin, an acrylic resin, a styrene resin and a polyvinyl chloride resin. Further, the resins may respectively be used independently or in combination. Further, the resins may contain reinforcing materials (filler), e.g., wood powder, metallic powder (particulate or fiber), talc, carbon fiber and glass fiber. The reinforcing materials having 2 mm or less (more preferably 150 micrometer or less) in size may preferably be used. Further, a mixing ratio of the resins and the reinforcing materials may preferably be 80:20 to 60:40. Generally, the resins containing the reinforcing materials may increase the molded resin substrate in specific gravity. For example, the polypropylene resin (specific gravity of 0.9) containing an appropriate amount of wood powder may substantially be increased from 0.9 to about 1.0 in specific gravity. Similarly, the polypropylene resin containing an appropriate amount of metallic powder may substantially be increased from 0.9 to about 1.2 in specific gravity.

<Tray Wall Portion>

As shown in FIG. 2, the tray wall portion 8 (the solid wall portion) may extend along a periphery (the front and back sides and the right side) of the tray bottom portion 6, so as to surround the battery VT positioned on the battery tray 2 (the tray bottom portion 6) on three sides. The tray wall portion 8 may be composed of a front tray wall portion 8a, a rear tray wall portion 8b and a right tray wall portion 8c, so as to have a U-shape as viewed from above. Therefore, the battery VT may be introduced into the battery tray 2 at a left side (i.e., an open side).

Further, the tray wall portion 8 (the front tray wall portion 8a, the rear tray wall portion 8b and the right tray wall portion 8c) may have a plurality of horizontal elongated protrusions 8d and a plurality of vertical reinforcement ribs 8e that are respectively formed in an inner surface thereof. The elongated protrusions 8d may horizontally extend along the tray wall portion 8, so as to be positioned substantially parallel to the bottom portion 6 at the same height as each other. Further, the elongated protrusions 8d may be configured such that the flanged portions (except for the left flanged portion 2v) formed in the battery VT can fit in a space formed between the elongated protrusions 8d and the tray bottom portion 6 when the battery VT is positioned on the battery tray 2. The reinforcement ribs 8e may be positioned on the elongated protrusions 8d, so as to be laterally juxtaposed to each other at certain intervals.

<Tray Bottom Portion>

The tray bottom portion 6 (the composite wall portion) may be composed of the horizontal substrate portions 21 and 22 (which may respectively be referred to as a first horizontal substrate portion 21 and a second horizontal substrate portion 22) and the wood members 10, 11 and 12 (which may respectively be referred to as a first (front) wood member 10, a second (back) wood member 11 and a third (left) wood member 12). The first to third wood members 10, 11 and 12 may be integrated with the first and second horizontal substrate portions 21 and 22 and the tray wall portion 8 in boundary portions or connecting portions 31, 32 and 33. Further, as best shown in FIG. 3, the tray bottom portion 6 may be divided to a right (first) or battery holding portion 6a and a left (second) or battery guiding portion 6b between which a boundary line is formed. The battery holding portion 6a may include the first horizontal substrate portion 21 and the first and second wood members 10 and 11. Conversely, the battery guiding portion 6b may include the second horizontal substrate portion 22 and the third wood member 12. Further, the second horizontal substrate portion 22 may substantially be divided into three portions, i.e., a front second horizontal substrate portion 22a, a back second horizontal substrate portion 22b and a left second horizontal substrate portion 22c via the third wood member 12.

The resin substrate (the horizontal substrate portions 21 and 22 and the vertical substrate portion 8) may have a plurality of retainer ribs 40, 41 and 42 (which may respectively referred to as first to third retainer ribs 40, 41 and 42) that are integrally formed therein. As shown in FIG. 3, the first and second retainer ribs 40 and 41 may be configured to extend along the wood members 10, 11 and 12 beyond the connecting portions 31, 32 and 33 at the upper surface 6U of the tray bottom portion 6. The first and second retainer ribs 40 and 41 may respectively have anchor portions 50 and 51 that are respectively formed therein as projections that project into and penetrate the wood members 10, 11 and 12 in a thickness direction (FIGS. 5 to 7), so as to be securely connected to the wood members 10, 11 and 12. Conversely, as shown in FIG. 4, the third retainer ribs 42 may be configured to extend along the wood members 10, 11 and 12 at the lower surface 6D of the tray bottom portion 6.

As shown in FIGS. 2 to 4, the horizontal substrate portions 21 and 22 may have a plurality of (three in this embodiment) attachment bases 7a, 7b and 7c that are respectively formed in the first horizontal substrate portion 21, the front second horizontal substrate portion 22a and the back second horizontal substrate portion 22b. The seating bases 7a, 7b and 7c are vertically projected at the lower surface 6D of the tray bottom portion 6 (FIG. 2). The attachment bases 7a, 7b and 7c may function as attachment portions to secure the battery tray 2 to a vehicle body (not shown) by bolting. Further, the horizontal substrate portions 21 and 22 may have a pair of connecting holes 5H for the fixture mechanism 5. In particular, the connecting holes 5H may respectively formed in the front second horizontal substrate portion 22a and the back second horizontal substrate portion 22b (i.e., the battery guiding portion 6b of the tray bottom portion 6).

<Wood Members>

Figure 6:
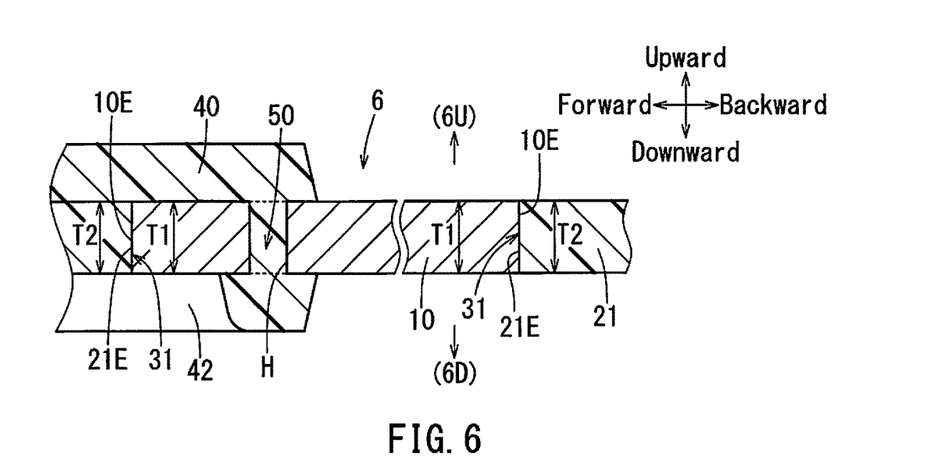
FIG. 6 is a cross-sectional view taken along line VI-VI of FIG. 3.
Figure 7:
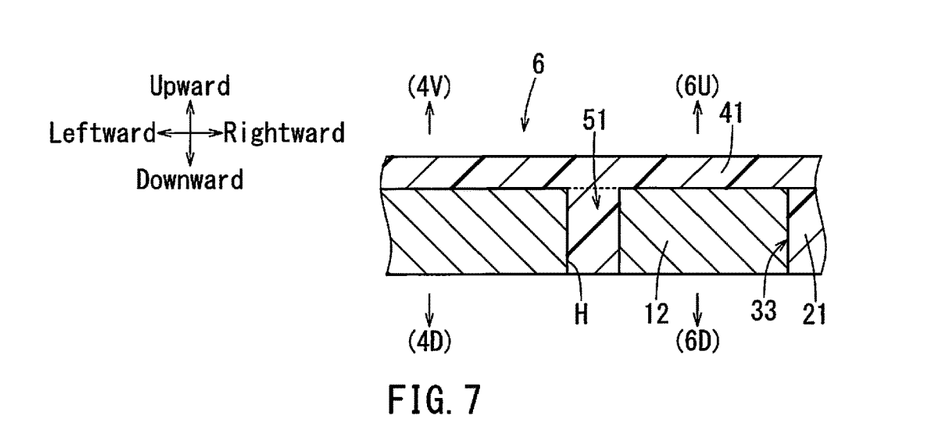
FIG. 7 is a cross-sectional view taken along line VII-VII of FIG. 3.

As previously described, the wood members 10, 11 and 12 constituting the tray bottom portion 6 may respectively be referred to as the first (front), second (back) and third (left) wood members 10, 11 and 12. As shown in FIGS. 3 and 4, each of the first and second wood members 10 and 11 may be formed of a rectangular plate-shaped wood member having a substantially uniform thickness. Conversely, the third wood member 12 may be formed as a longitudinally elongated slim rectangular plate-shaped member having a substantially uniform thickness. Further, as shown in FIGS. 6 and 7, the wood members 10, 11 and 12 may respectively have a plurality of through holes H formed therein such that the anchor portions 50 and 51 may be formed within the through holes H during the insert molding (injection molding) of the tray main body 4.

The type of the wood members 10, 11 and 12 is not specially limited. For example, the wood members 10, 11 and 12 may respectively be made of a needle leaf tree such as cedar, Japanese cypress and pine and a broad-leaf tree such as Japanese zelkova and beech. Further, the wood members 10, 11 and 12 may respectively be made of solid wood or laminated wood, plywood or other such improved wood. Further, the wood members 10, 11 and 12 may preferably be made of wood having specific gravity smaller than the resin substrate (the substrate portions 21 and 22). For example, the wood members 10, 11 and 12 may be made of wood having specific gravity less than 1.0 (preferably 0.4 to 0.7) when the resin substrate has specific gravity of 1.0 or more.

<Positional Relationship of Horizontal Substrate Portions and Wood Members>

As previously described, the tray bottom portion 6 may include the horizontal substrate portions 21 and 22 and the first to third wood members 10, 11 and 12. As shown in FIGS. 3 and 4, the first to third wood members 10, 11 and 12 may be embedded in the horizontal substrate portions 21 and 22 with their upper and lower (inner and outer) surfaces exposed on the inner surface 6U and the outer surface 6D of the tray bottom portion 6. Further, in the battery holding portion 6a of the tray bottom portion 6, the first and second wood members 10 and 11 may respectively be longitudinally oppositely positioned across the first horizontal substrate portion 21. Conversely, in the battery guiding portion 6b of the tray bottom portion 6, the third wood member 12 may be positioned in a longitudinally central portion of the second horizontal substrate portion 22, i.e., positioned between the front second horizontal substrate portion 22a and the back second horizontal substrate portion 22b.

<Connecting Portions>

As previously described, the first to third wood members 10, 11 and 12 may respectively be integrated with the first and second horizontal substrate portions 21 and 22 and the tray wall portion 8 in the boundary portions or connecting portions 31, 32 and 33 (which may respectively be referred to as a first (front) connecting portion 31, a second (back) connecting portion 32 and a third (left) connecting portion 33). That is, the tray bottom portion 6 may have the first to third connecting portions 31, 32 and 33 in which the first to third wood members 10, 11 and 12 are connected to the first and second horizontal substrate portions 21 and 22 and the tray wall portion 8. In particular, the first connecting portion 31 may be positioned around the first wood member 10, so as to connect the first wood member 10 to the first horizontal substrate portion 21, the second horizontal substrate portion 22 (the front second horizontal substrate portion 22a) and the tray wall portion 8. The second connecting portion 32 may be positioned around the second wood member 11, so as to connect the second wood member 11 to the first horizontal substrate portion 21, the second horizontal substrate portion 22 (the back second horizontal substrate portion 22b) and the tray wall portion 8. Further, the third connecting portion 33 may be positioned around the third wood member 12, so as to connect the third wood member 12 to the first horizontal substrate portion 21 and the second horizontal substrate portion 22 (the front second horizontal substrate portion 22a, the back second horizontal substrate portion 22b and the left second horizontal substrate portion 22c).

<Peripheral Structures of Wood Members and Horizontal Substrate Portions>

The first to third wood members 10, 11 and 12 may respectively have the same peripheral structure, i.e., the same structure in their peripheral portions extending along the first to third connecting portions 31, 32 and 33. Similarly, the first and second horizontal substrate portions 21 and 22 may respectively have the same peripheral structure, i.e., the same structure in their peripheral portions extending along the first to third connecting portions 31, 32 and 33. Therefore, the structures of the first wood member 10 and the first horizontal substrate portion 21 may be described as a representative of the first to third wood members 10, 11 and 12 and the first and second horizontal substrate portions 21 and 22. As shown in FIG. 6, the first connecting portion 31 may be defined as a joining portion of an end surface 10E of the first wood member 10 and an end surface 21E of the first horizontal substrate portion 21. The end surface 10E of the first wood member 10 may be formed as a vertical surface substantially perpendicular to upper and lower surfaces of the first wood member 10 (i.e., perpendicular to the both surfaces of the tray bottom portion 6). Similarly, the end surface 21E of the first horizontal substrate portion 21 may be defined as a vertical surface substantially perpendicular to upper and lower surfaces of the first horizontal substrate portion 21 (i.e., perpendicular to the both surfaces of the tray bottom portion 6) and corresponding to the end surface 10E of the first wood member 10.

As shown in FIG. 6, the first wood member 10 may have a thickness T1 in the peripheral portion adjacent to the first connecting portion 31. Conversely, the first horizontal substrate portion 21 may have a thickness T2 (a predetermined thickness) in the peripheral portion adjacent to the first connecting portion 31. The thickness T1 may be determined to be substantially equal to the thickness T2. That is, a ratio of the thickness T1 to the thickness T2 may be determined to approximately 1.0 with an allowable margin of error of plus or minus 5%. Further, in this embodiment, the first wood member 10 may have a substantially uniform thickness over the entire area thereof. That is, the first wood member 10 may have a thickness equal to the thickness T1 over the entire area thereof (except for the through holes H). Further, the ratio of the thickness T1 to the thickness T2 may be determined to a range of not less than 0.7 and not greater than 1.0, preferably not less than 0.8 and not greater than 1.0.

<Retainer Ribs>

As previously described, the resin substrate (the first and second horizontal substrate portions 21 and 22 and the vertical substrate portion 8) may have the first retainer ribs 40, the second retainer ribs 41 and the third retainer ribs 42 that are integrally formed therein in order to reinforce the tray bottom portion 6. As shown in FIG. 3, the first and second retainer ribs 40 and 41 may be configured to extend along the first to third wood members 10, 11 and 12 at the upper surface 6U of the tray bottom portion 6. Further, the first and second retainer ribs 40 and 41 may be positioned on the tray bottom portion 6 (the battery holding portion 6a and the battery guiding portion 6b) in a symmetrical fashion about a lateral axis.

The first retainer ribs 40 may respectively be formed in the front tray wall portion 8a and the rear tray wall portion 8b so as to longitudinally extend along the first and second wood members 10 and 11 beyond the first and second connecting portions 31 and 32. Further, the first retainer ribs 40 formed in the front tray wall portion 8a and the first retainer ribs 40 formed in the rear tray wall portion 8b may respectively be referred to as the front first retainer ribs 40 and the rear first retainer ribs 40. The front first retainer ribs 40 may be laterally aligned at certain intervals. Similarly, the rear first retainer ribs 40 may be laterally aligned at certain intervals. Further, each of the front and rear first retainer ribs 40 may preferably have a triangular shape as viewed from above.

Conversely, the second retainer ribs 41 may respectively be formed in the right tray wall portion 8c so as to laterally extend along the first and second wood members 10 and 11 beyond the first and second connecting portions 31 and 32. Further, the second retainer ribs 41 formed in the right tray wall portion 8c and extending over the first wood member 10 may be referred to as the right-front second retainer ribs 41. Conversely, the second retainer ribs 41 formed in the right tray wall portion 8c and extending over the second wood member 11 may be referred to as the right-rear second retainer ribs 41. The (right-front and right-rear) second retainer ribs 41 may be positioned longitudinally adjacent to each other at certain intervals. Further, each of the second retainer ribs 41 may have a triangular shape as viewed from above.

Further, as shown in FIGS. 2 and 3, the resin substrate (the first and second horizontal substrate portions 21 and 22 and the vertical substrate portion 8) may have a longitudinal bridging rib extending between the front tray wall portion 8a and the rear tray wall portion 8b at the upper surface 6U of the tray bottom portion 6 along the boundary line formed between the battery holding portion 6a and the battery guiding portion 6b of the tray bottom portion 6. Some of the second retainer ribs 41 may be formed in the longitudinal bridging rib so as to extend along the first to third wood members 10, 11 and 12. Further, the second retainer ribs 41 extending over the third wood member 12 may be referred to as the left-central second retainer ribs 41. Conversely, the second retainer ribs 41 extending over the first and second wood members 10 and 11 may respectively be referred to as the left-front second retainer ribs 41 and the left-rear second retainer ribs 41. The left-central second retainer ribs 41, the left-front second retainer ribs 41 and the left-rear second retainer ribs 41 may respectively be positioned longitudinally adjacent to each other at certain intervals. Further, the left-front second retainer ribs 41 and the left-rear second retainer ribs 41 may respectively include special second retainer ribs 41a and 41b that extend over the entire width of the battery holding portion 6a of the tray bottom portion 6.

As shown in FIG. 4, the third retainer ribs 42 may be formed in the first horizontal substrate portion 21 and the vertical substrate portion 8 (the front, rear and right tray wall portions 8a, 8b and 8c) so as to extend along the first and second wood members 10 and 11 at the inner surface 6D of the tray bottom portion 6. Further, unlike the first and second retainer ribs 40 and 41, the third retainer ribs 42 may be formed as specially arranged continuous ribs that are positioned on the tray bottom portion 6 (the battery holding portion 6a) in a symmetrical fashion about the lateral axis. The third retainer ribs 42 may be configured to partially overlap the first retainer ribs 40 and the second retainer ribs 41 with the first and second wood members 10 and 11 interleaved therebetween. In particular, the third retainer ribs 42 may include six diagonal first rib sections 42a, four diagonal second rib sections 42b, two transverse third rib sections 42c and three longitudinal fourth rib sections 42d that intersect with each other. The third rib sections 42c may be configured to be vertically aligned with the special second retainer ribs 41a and 41b of the second retainer ribs 41 with the first and second wood members 10 and 11 interleaved therebetween. Conversely, one of the fourth rib sections 42d may be configured to be vertically aligned with the bridging rib formed in the resin substrate at the upper surface 6U of the tray bottom portion 6 with the first, second and third wood members 10 and 11 interleaved therebetween. Further, the third retainer ribs 42 may preferably be formed so as to be continuous with the attachment bases 7a, 7b and 7c.

<Anchor Portions>

Figure 5:
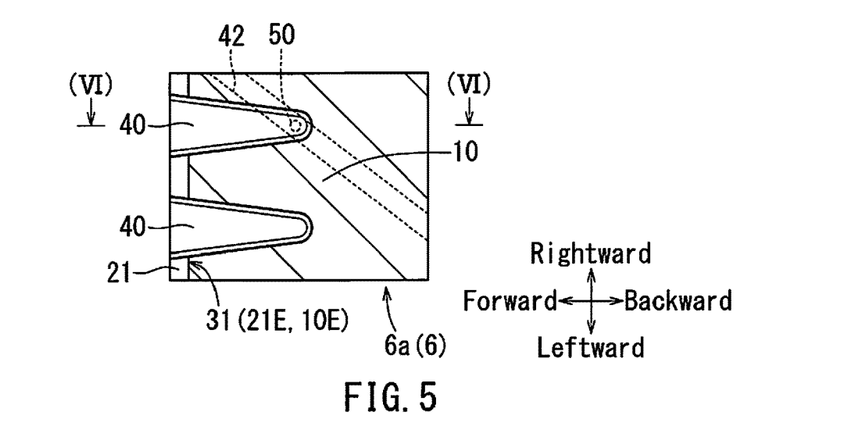
FIG. 5 is an enlarged view of a boxed portion V in FIG. 3.

As previously described, the first and second retainer ribs 40 and 41 may respectively have the anchor portions 50 and 51 penetrating the first to third wood members 10, 11 and 12 in the thickness direction (FIGS. 5 to 7). As shown in FIG. 6, the anchor portions 50 formed in the first retainer ribs 40 may be configured to penetrate the first wood member 10 (the second wood member 11) and to be integrated with the third retainer ribs 42 in the lower surface 6D of the tray bottom portion 6. Conversely, as shown in FIG. 7, the anchor portions 51 formed in the second retainer ribs 41 may be configured to penetrate the third wood member 12 and to reach the lower surface 6D of the tray bottom portion 6.

<Manufacturing Method of Battery Tray>

Figure 8:
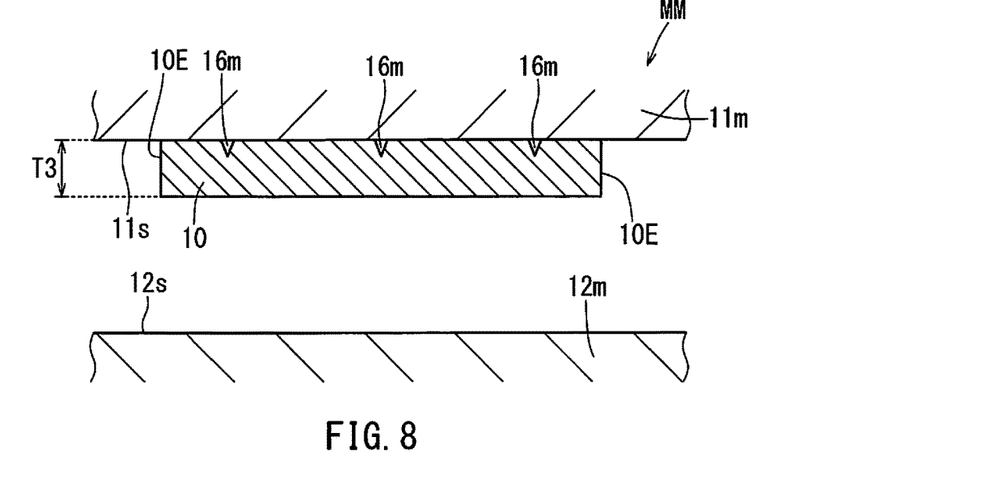
FIG. 8 is a partially cross-sectional view of a molding machine, which view shows a condition in which a wood member is temporarily secured to an upper die of a molding die unit of a molding machine.
Figure 9:
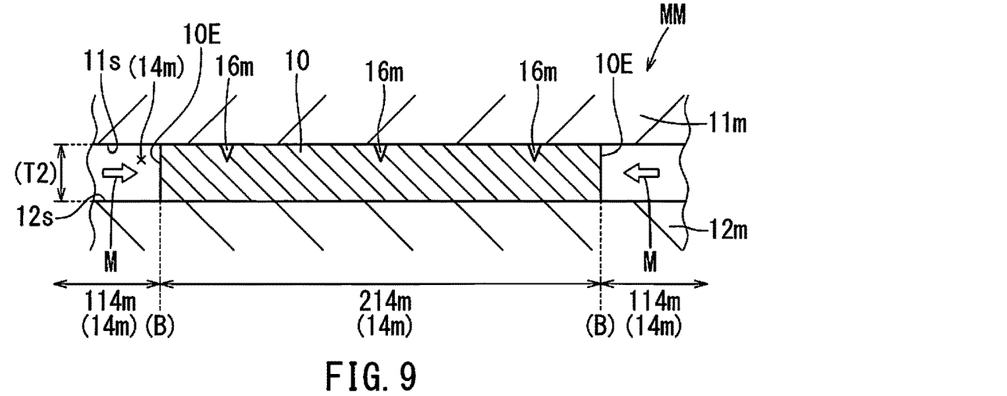
FIG. 9 is a partially cross-sectional view of the molding machine, which view shows a condition in which the molding die unit is closed.

A molding machine (an injection molding machine) MM may be used in order to manufacture the battery tray 2 (the tray main body 4). As shown in FIGS. 8 and 9, the molding machine MM may include a molding die unit having an upper or first die 11m and a lower or second die 12m. As shown in FIG. 9, the first die 11m and the second die 12m may be configured to define a molding cavity 14m between an inner surface 11s of the first die 11m and an inner surface 12s of the second die 12m when the molding die unit is closed. The molding cavity 14m may have a profile or shape corresponding to the tray main body 4 (the tray bottom portion 6 and the tray wall portion 8). Further, the molding cavity 14m may be composed of a first cavity portion 114m in which the resin substrate (the horizontal substrate portions 21 and 22 and the vertical substrate portion 8) is molded and a second cavity portion 214m in which the first to third wood members 10, 11 and 12 (only the first wood member 10 is shown) are previously positioned.

As shown in FIG. 9, the molding cavity 14m (the first cavity portion 114m) may have a height equal to the thickness T2 of the first horizontal substrate portion 21 (FIG. 6). Further, the first die 11m may have a plurality of temporarily holding devices 16m formed in the inner surface 11s thereof and configured to temporarily hold the first to third wood members 10, 11 and 12 on the first die 11m until the molding die unit is closed. Further, various types of pins may preferably be used as the temporarily holding devices 16m. The first to third wood members 10, 11 and 12 (only the first wood member 10 is shown) to be positioned in the molding cavity 14m (the second cavity portion 214m) may be temporarily held on the inner surface 11s with the pins stuck therein.

In order to mold the battery tray 2 (the tray main body 4) that is composed of the resin substrate and the wood insert embedded in the resin substrate, in a first molding step, the first to third wood members 10, 11 and 12 may be temporarily held on the first die 11m using the temporarily holding devices 16m in a condition in which the molding die unit is opened (FIG. 8). Thereafter, the molding die unit is closed in order to form the molding cavity 14m, i.e., the first cavity portion 114m and the second cavity portion 214m in which the first to third wood members 10, 11 and 12 are positioned (FIG. 9). Further, as shown in FIG. 9, in the molding cavity 14m thus formed, the first cavity portion 114m may be separated from the second cavity portion 214m by cavity boundaries B corresponding to the end surface 10E of the first wood member 10.

Next, in a second molding step, a molding material (resin) M may be injected into the molding cavity 14m (the first cavity portion 114m), so as to mold the resin substrate, i.e., the horizontal substrate portions 21 and 22 and the vertical substrate portion 8. As a result, the molded resin substrate may be combined with the wood insert in the cavity boundaries B, so that the tray main body 4 may be formed as a unit. In the tray main body 4 thus formed, the resin substrate (the horizontal substrate portions 21 and 22 and the vertical substrate portion 8) may be combined with the wood insert (the first to third wood members 10, 11 and 12). Further, when the resin substrate is molded, the first to third retainer ribs 40, 41 and 42 and the anchor portions 50 and 51 may be simultaneously formed.

<Structures of Wood Members Before Molding>

As shown in FIG. 8, before molding, the first wood member 10 may have a thickness T3 in the peripheral portion (the end surface 10E) thereof. In this embodiment, a ratio of the thickness T3 to a predetermined height of the molding cavity 14m (which correspond to the thickness T2 of the first horizontal substrate portion 21) may be determined to approximately 1.0 with an allowable margin of error of plus or minus 5%. Therefore, the molding material M may be prevented from entering the second cavity portion 214m, i.e., prevented from wrapping around the first wood member 10 positioned in the second cavity portion 214m, during molding, so that the first wood member 10 may be prevented from being compressed in the thickness direction by the molding material M. As a result, the molded battery tray 2 in which the ratio of the thickness T1 to the thickness T2 is equal to 1.0 may be produced (FIG. 6). Therefore, the wood insert (the first to third wood members 10, 11 and 12) may be embedded in and integrated with the resin substrate (the horizontal substrate portions 21 and 22 and the vertical substrate portion 8) with its upper and lower (inner and outer) surfaces substantially completely exposed on the inner surface 6U and the outer surface 6D of the tray bottom portion 6. Further, in the molded battery tray 2 thus produced, the first to third wood members 10, 11 and 12 may be connected to the horizontal substrate portions 21 and 22 and the vertical substrate portion 8 in the connecting portions 31, 32 and 33 which are defined as joining portions of end surfaces of the first to third wood members 10, 11 and 12 (e.g., the end surface 10E of the first wood member 10) and end surfaces of the horizontal substrate portions 21 and 22 (e.g., the end surface 21E of the first horizontal substrate portion 21).

Further, the ratio of the thickness T3 to the thickness T2 may be determined to a range of not less than 0.8 and less than 1.0, preferably not less than 0.85 and less than 1.0. When the ratio of the thickness T3 to the thickness T2 falls within such a range, after molding, the ratio of the thickness T1 (FIG. 6) of the first wood member 10 to the thickness T2 may be held in a range of not less than 0.7 to less than 1.0 even if the first wood member 10 is compressed or thinned due to an injection pressure of the molding material M penetrating into the second cavity portion 214m, i.e., protruding onto or wrapping around the first wood member 10 positioned in the second cavity portion 214m, during molding. That is, the molding material M may be prevented from being excessively entering the second cavity portion 214m, so that the molded battery tray 2 may be prevented from being excessively increased in weight. Further, the first wood member 10 may be prevented from being excessively compressed by the molding material M penetrating into the second cavity portion 214m. As a result, the first wood member 10 may be prevented from being warped.

Further, the ratio of the thickness T3 to the thickness T2 may be determined to a range of not less than 1.0 and less than 1.6, preferably not less than 1.0 and less than 1.25, as necessary. When the ratio of the peripheral thickness T3 to the peripheral thickness T2 falls within such a range, the first wood member 10 may be compressed to be reduced in thickness such that the ratio of the peripheral thickness T3 to the peripheral thickness T2 may be reduced to approximately 1.0 when the molding die unit is closed. Therefore, the molding material M may be prevented from entering the second cavity portion 214m during molding. As a result, the molded battery tray 2 in which the ratio of the thickness T1 to the thickness T2 is equal to 1.0 may be produced (FIG. 6). Further, in the molded battery tray 2, the wood insert (the first to third wood members 10, 11 and 12) may be embedded in the resin substrate (the horizontal substrate portions 21 and 22 and the vertical substrate portion 0.8) with its upper and lower (inner and outer) surfaces substantially completely exposed on the inner surface 6U and the outer surface 6D of the tray bottom portion 6.

<Use of Battery Tray>

In order to secure the battery VT to the battery tray 2, the battery VT may be laterally slid or moved along the battery guiding portion 6b of the tray bottom portion 6 from left so as to be positioned on the battery holding portion 6a of the tray bottom portion 6. Thereafter, the battery VT may be connected to the battery tray 2 by the fixture mechanism 5.

In particular, as shown in FIG. 1, the fixture mechanism 5 may have an upper or first fixture plate 5a, a lower or second fixture plate 5b and bolts BT and screws. In order to secure the battery VT to the battery tray 2, the first fixture plate 5a and the second fixture plate 5b may be applied to the battery tray 2 with the left flanged portion 2v and the battery guiding portion 6b interleaved therebetween. The first fixture plate 5a and the second fixture plate 5b thus positioned may be connected to each other by the bolts BT passed through the connecting holes 5H formed in the battery guiding portion 6b and the screws, so that the battery VT is secured to the battery tray 2. Thus, the battery VT is integrated with the battery tray 2 while it is positioned on the tray bottom portion 6. The battery tray 2 to which the battery VT is secured may then be attached to the vehicle body by bolting using the attachment bases 7a, 7b and 7c respectively formed in the tray bottom portion 6.

<Advantages of Battery Tray>

According to the embodiment, the molded battery tray 2 may be configured such that the first to third wood members 10, 11 and 12 (the wood insert) may be embedded in the horizontal substrate portions 21 and 22 (the resin substrate) with their upper and lower (inner and outer) surfaces substantially completely exposed on the inner surface 6U and the outer surface 6D of the tray bottom portion 6. Therefore, the battery tray 2 may have a good appearance. Further, the battery tray 2 may be reduced in weight due to the embedded first to third wood members 10, 11 and 12. Further, in the molded battery tray 2 thus produced, the first to third wood members 10, 11 and 12 may be connected to the horizontal substrate portions 21 and 22 and the vertical substrate portion 8 in the connecting portions 31, 32 and 33 which are defined as the joining portions of the end surfaces of the first to third wood members 10, 11 and 12 (e.g., the end surface 10E of the first wood member 10) and the end surfaces of the horizontal substrate portions 21 and 22 (e.g., the end surface 21E of the first horizontal substrate portion 21). Therefore, the first to third wood members 10, 11 and 12 may be securely connected to the horizontal substrate portions 21 and 22 and the vertical substrate portion 8 with a substantial connecting strength.

Further, the molded battery tray 2 may have the first to third retainer ribs 40, 41 and 42. The first and second retainer ribs 40 and 41 may extend along the wood members 10, 11 and 12 at the upper surface 6U of the tray bottom portion 6. Conversely, the third retainer ribs 42 may extend along the wood members 10, 11 and 12 at the lower surface 6D of the tray bottom portion 6. Thus, the tray bottom portion 6 may be effectively reinforced by the first to third retainer ribs 40, 41 and 42. As a result, the tray bottom portion 6 (the battery tray 2) may have increased rigidity.

Further, the first and second retainer ribs 40 and 41 may respectively have the anchor portions 50 and 51. The anchor portions 50 formed in the first retainer ribs 40 may penetrate the first wood member 10 (the second wood member 11), so as to be integrated with the third retainer ribs 42 in the lower surface 6D of the tray bottom portion. Conversely, the anchor portions 51 formed in the second retainer ribs 41 may penetrate the third wood member 12, so as to terminate in the lower surface 6D of the tray bottom portion 6. The anchor portions 50 and 51 thus constructed may function to reliably combine the resin substrate (the horizontal substrate portions 21 and 22 and the vertical substrate portion 8) to the first to third wood members 10, 11 and 12 via the first and second retainer ribs 40 and 41. Therefore, the first and second retainer ribs 40 and 41 may further reinforce the tray bottom portion 6 due to the anchor portions 50 and 51 formed therein.

According to the manufacturing method of the battery tray 2, the molding material M may be prevented from entering the second cavity portion 214m, i.e., prevented from wrapping around the first wood member 10 positioned in the second cavity portion 214m, during molding. Therefore, in the molded battery tray 2 manufactured by the method, the first to third wood members 10, 11 and 12 may be embedded in the horizontal substrate portions 21 and 22 with their upper and lower surfaces substantially completely exposed on the inner surface 6U and the outer surface 6D of the tray bottom portion 6. Further, the first wood member 10 may be prevented from being compressed by the molding material M. In addition, the first to third wood members 10, 11 and 12 may be positioned on the inner surface 11s of the first die 11m using the temporarily holding device 16m. Therefore, the first to third wood members 10, 11 and 12 may be easily changed in arrangement as necessary.

EXAMPLES

Examples of the molded article will now be described. Further, the following examples are illustrative and should not be construed as limitations of the disclosure.

Tests were performed using example molded articles (Examples 1-4) and control molded articles (Control 1-4) in order to evaluate a lightening effect of wood members (wood insert) on the example molded articles and an amount of molding material wrapping around the wood members during molding. Results are shown in Table 1 and Table 2.

Further, a test piece (example molded article) of Example 1 was formed by injection molding (insert molding) using a plywood board (thickness of 2.0 mm; specific gravity of 0.4 to 0.7) as the wood member and a polypropylene resin containing wood powder (specific gravity of 1.02). Further, a molding machine was configured such that a height of a molding cavity may be equal to a thickness (e.g., 2.5 mm) of a substrate portion (resin substrate). Further, an injection pressure of the molding material was set to 40 Mpa (408 kg/cm$^2$). Each of test pieces (example molded articles) of Example 2 to 4 and test pieces (control molded articles) of Control 1 to 4 was formed in the same manner as Example 1 except that the thickness of the plywood board and the thickness of the substrate portion. Further, a molded article for comparison was formed in the same manner as Example 1 except that the plywood board was omitted.

TABLE 1

| | Thickness of Substrate Portion (mm) | Thickness of Wood Member (mm) | | Compression Rate (%) | Lightening Effect |
| --- | --- | --- | --- | --- | --- |
| | | Before Molding | After Molding | | |
| Example 1 | 2.5 | 2.0 | 1.8 | 10 | Yes |
| Example 2 | 2.3 | 2.0 | 1.9 | 5 | Yes |
| Example 3 | 2.0 | 2.0 | 2.0 | 0 | Yes |
| Example 4 | 2.0 | 2.5 | 2.3 | 8 | Yes |
| Control 1 | 4.0 | 2.0 | 1.0 | 50 | No |
| Control 2 | 3.5 | 2.0 | 1.0 | 50 | No |
| Control 3 | 3.0 | 2.0 | 1.5 | 25 | Yes |
| Control 4 | 1.5 | 2.5 | — | — | — |

TABLE 2

| | Ratio of Thickness of Wood Member to Thickness of Substrate Portion (%) | | Amount of Molding Material Wrapping Around Wood Member |
| --- | --- | --- | --- |
| | Before Molding | After Molding | |
| Example 1 | 80 | 72 | Small |
| Example 2 | 87 | 83 | Small |
| Example 3 | 100 | 100 | Nothing |
| Example 4 | 125 | 115 | Nothing |
| Control 1 | 50 | 25 | Large |
| Control 2 | 57 | 29 | Large |
| Control 3 | 67 | 50 | Large |
| Control 4 | 167 | — | — |

The results shown in Tables 1 and 2 demonstrate that each of the example molded articles of Examples 1 to 4 has a lightning effect. This means that when a ratio of a thickness of a wood member (before molding) to a thickness of a substrate portion falls within a range of 0.8 to 1.25 (80% to 125%), a molded article formed using such a wood member may have a lightening effect. In particular, the example molded article of Example 3 has a weight of 620 grams whereas the molded article for comparison has a weight of 658 grams. Thus, the example molded article of Example 3 is determined to have a lightening effect. Each of the example molded articles of Examples 1, 2 and 4 and the control molded articles of Controls 1 to 3 is determined in the same manner as the example molded article of Example 1.

Further, the results shown in Tables 1 and 2 demonstrate that each of the control molded articles of Controls 1 to 3 has no lightning effect except for the control molded article of Control 3. This means that when the ratio of the thickness of the wood member (before molding) to the thickness of the substrate portion is less than about 0.6 (i.e., 60%), a molded article formed using such a wood member has no lightening effect. Further, when the ratio of the thickness of the wood member (before molding) to the thickness of the substrate portion is greater than 1.25 (125%), in particular 1.67 (167%), a molding die unit of the molding machine cannot be closed (Control 4).

Conversely, the results shown in Table 2 demonstrate that in each of the example molded articles of Examples 1 to 4, the molding material may substantially be prevented from wrapping around the wood member during molding whereas in each of the control molded articles of Controls 1 to 4, the molding material may considerably wrap around the wood member during molding. This means that only when the ratio of the thickness of the wood member to the thickness of the substrate portion is 0.8 (i.e., 80%) or more before molding, the molding material can be effectively prevented from wrapping around the wood member during molding, so that the ratio of the thickness of the wood member to the thickness of the substrate portion can be kept to 0.7 (i.e., 70%) or more after molding. Further, in each of the example molded articles of Examples 1 to 4, upper and lower (inner and outer) surfaces of the wood member are substantially completely exposed. Thus, each of the example molded articles of Examples 1 to 4 has a good appearance in addition to a lightening effect.

Further, in the example molded article of Examples 3 in which the ratio of the thickness of the wood member to the thickness of the substrate portion is 1.0 (i.e., 100%) before molding, the molding material can be completely prevented from wrapping around the wood member during molding, so that the ratio of the thickness of the wood member to the thickness of the substrate portion can be kept to 1.00 (i.e., 100%) even after molding. Thus, the example molded article of Example 3 has an excellent appearance in addition to a lightening effect.

<Modified Forms>

Naturally, various changes and modifications may be made to the present disclosure without departing from the scope of the disclosure.

Figure 10:
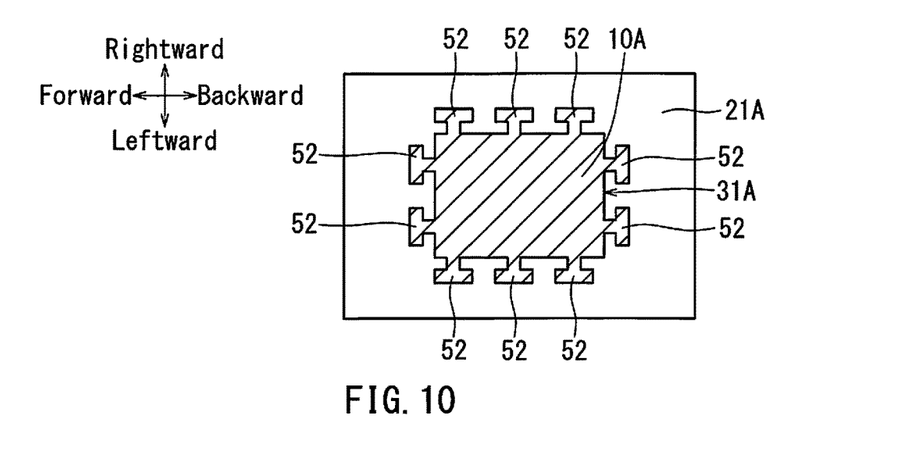
FIG. 10 is a partially plan view of a battery tray according to a first modified form, in which a wood insert has anchor devices.

As shown in FIG. 10, in a first modified form, the first wood member 10 and the first horizontal substrate portion 21 may respectively be replaced with a modified first wood member 10A and a modified first horizontal substrate portion 21A. The modified first wood member 10A and the modified first horizontal substrate portion 21A may be integrated with each other via a modified first connecting portion 31A. Further, the modified first wood member 10A may have a plurality of anchor devices 52 formed in an end surface thereof. Each of the anchor devices 52 may be formed as a projection having a T-shape in transverse cross section. Further, each of the anchor devices 52 may be configured to engage each of recesses formed in an end surface of the modified first horizontal substrate portion 21A. According to the first modified form, the modified first wood member 10A may be securely integrated with the modified first horizontal substrate portion 21A in the modified first connecting portion 31A due to engagement of the anchor devices 52 formed in the modified first wood member 10A and the recesses formed in the modified first horizontal substrate portion 21A.

Figure 11:
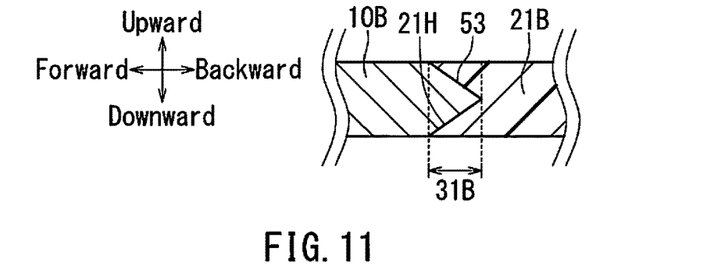
FIG. 11 is a partially cross-sectional view of a battery tray according to a second modified form, in which a wood insert has anchor devices.

As shown in FIG. 11, in a second modified form, the first wood member 10 and the first horizontal substrate portion 21 may respectively be replaced with a modified first wood member 10B and a modified first horizontal substrate portion 21B. The modified first wood member 10B and the modified first horizontal substrate portion 21B may be integrated with each other via a modified first connecting portion 31B. Further, the modified first wood member 10B may have an anchor device 53 formed in and along an end surface thereof. The anchor device 53 may be formed as a wedge-shaped engagement projection. Further, the anchor device 53 may be configured to fit in a recess 21H formed in an end surface of the modified first horizontal substrate portion 21B and having a V-shape in vertical cross section. According to the second modified form, the modified first wood member 10B may be securely integrated with the modified first horizontal substrate portion 21B in the modified first connecting portion 31B due to engagement of the anchor device 53 formed in the modified first wood member 10B and the recess 21H formed in the modified first horizontal substrate portion 21B.

Figure 12:
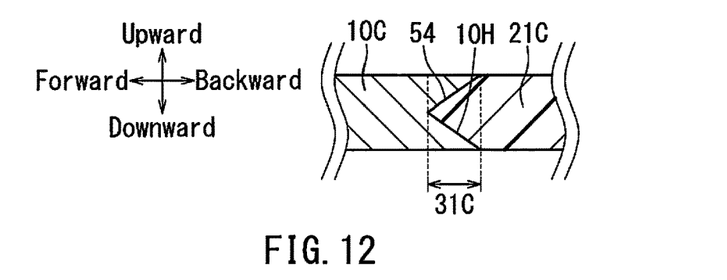
FIG. 12 is a partially cross-sectional view of a battery tray according to a third modified form, in which a wood insert has anchor devices.

As shown in FIG. 12, in a third modified form, the first wood member 10 and the first horizontal substrate portion 21 may respectively be replaced with a modified first wood member 10C and a modified first horizontal substrate portion 21C. The modified first wood member 10C and the modified first horizontal substrate portion 21C may be integrated with each other via a modified first connecting portion 31C. Further, the modified first wood member 10C may have an anchor device 10H formed in and along an end surface thereof. The anchor device 10H may be formed as a recess formed in an end surface of the modified first wood member 10C and having a V-shape in vertical cross section. Further, the anchor device 10H may be configured to engage a wedge-shaped engagement projection 54 formed in an end surface of the modified first horizontal substrate portion 21C. According to the third modified form, the modified first wood member 10C may be securely integrated with the modified first horizontal substrate portion 21C in the modified first connecting portion 31C due to engagement of the anchor device 10H formed in the modified first wood member 10C and the engagement projection 54 formed in the modified first horizontal substrate portion 21C.

Figure 13:
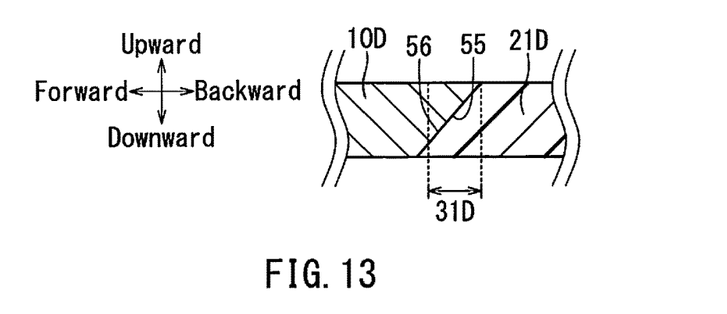
FIG. 13 is a partially cross-sectional view of a battery tray according to a fourth modified form, in which a wood insert has anchor devices.

As shown in FIG. 13, in a fourth modified form, the first wood member 10 and the first horizontal substrate portion 21 may respectively be replaced with a modified first wood member 10D and a modified first horizontal substrate portion 21D. The modified first wood member 10D and the modified first horizontal substrate portion 21D may be integrated with each other via a modified first connecting portion 31D. Further, the modified first wood member 10D may have an anchor device 55 formed in and along an end surface thereof. The anchor device 55 may be formed as an oblique surface. Further, the anchor device 55 may be configured to engage an oblique surface 56 formed in an end surface of the modified first horizontal substrate portion 21D. According to the fourth modified form, the modified first wood member 10D may be securely integrated with the modified first horizontal substrate portion 21D in the modified first connecting portion 31D due to engagement of the anchor device 55 (oblique surface) formed in the modified first wood member 10D and the oblique surface 56 formed in the modified first horizontal substrate portion 21D.

Figure 14:
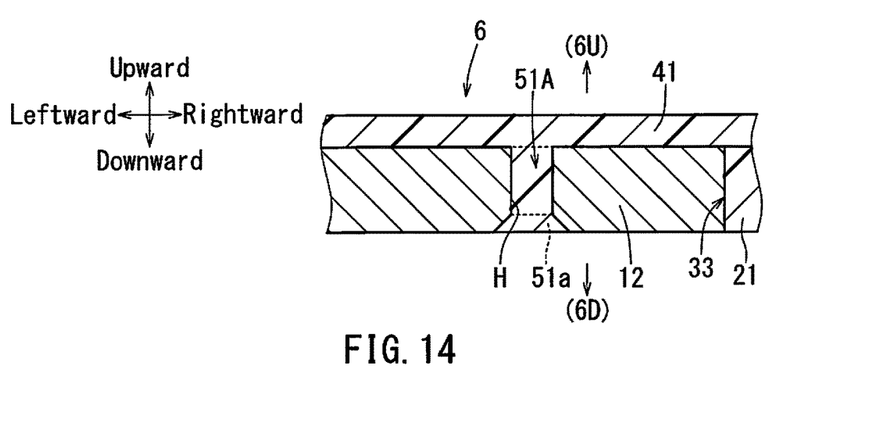
FIG. 14 is a partially cross-sectional view of a battery tray according to a fifth modified form, in which a resin substrate has anchor portions that are different from the anchor portions formed in the resin substrate in the embodiment.

As shown in FIG. 14, in a fifth modified form, the anchor portions 51 formed in the second retainer ribs 41 may be replaced with modified anchor portions 51A. Similar to the anchor portion 51, the modified anchor portions 51A may be configured to penetrate the third wood member 12 and to reach the lower surface 6D of the tray bottom portion 6. However, the modified anchor portions 51A may have countersunk head portions 51a that are embedded in the third wood member 12. The countersunk head portions 51a of the modified anchor portions 51A may function as retainers or stoppers. Therefore, the modified anchor portions 51A thus constructed may function to more surely or reliably combine the first horizontal substrate portion 21 to the third wood member 12 via the second retainer ribs 41.

Figure 15:
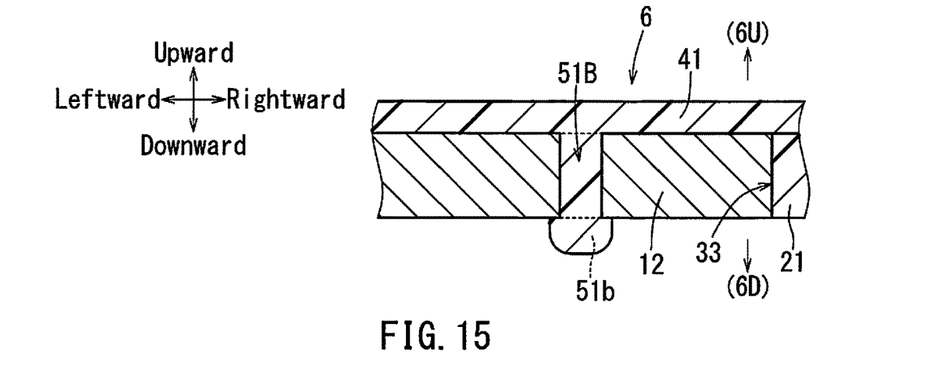
FIG. 15 is a partially cross-sectional view of a battery tray according to a sixth modified form, in which a resin substrate has anchor portions that are different from the anchor portions formed in the resin substrate of the embodiment.

As shown in FIG. 15, in a sixth modified form, the anchor portions 51 formed in the second retainer ribs 41 may be replaced with modified anchor portions 51B. Similar to the anchor portion 51, the modified anchor portions 51B may be configured to penetrate the third wood member 12 and to reach the lower surface 6D of the tray bottom portion 6. However, the modified anchor portions 51B may have head portions 51b projected on the lower surface 6D of the tray bottom portion 6 and having a substantially semicircular shape in cross section. The head portions 51a of the modified anchor portions 51B may function as retainers or stoppers. Therefore, the modified anchor portions 51B thus constructed may function to more surely or reliably combine the first horizontal substrate portion 21 to the third wood member 12 via the second retainer ribs 41. Further, the head portions 51 may have various shapes, e.g., a square shape, a trapezoidal shape and a triangular shape in cross section.

Figure 16:
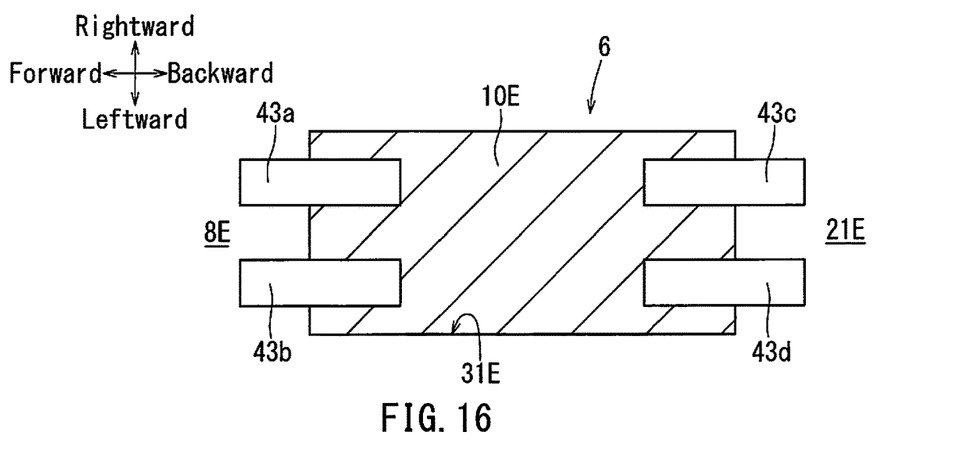
FIG. 16 is a partially plan view of a battery tray according to a seventh modified form, in which a resin substrate has ribs that are different from the ribs formed in the resin substrate of the embodiment.

As shown in FIG. 16, in a seventh modified form, the first wood member 10, the first horizontal substrate portion 21 and the tray wall portion 8 may respectively be replaced with a modified first wood member 10E, a modified first horizontal substrate portion 21E and a modified tray wall portion 8E. The modified first wood member 10E, the modified first horizontal substrate portion 21E and the modified tray wall portion 8E may be integrated with each other via a modified first connecting portion 31E. Further, the modified tray wall portion 8E and the modified first horizontal substrate portion 21E may respectively have a pair of (front) retainer ribs 43a and 43b and a pair of (rear) retainer ribs 43c and 43d in place of or in addition to the first and second retainer ribs 40 and 41. The pair of retainer ribs 43a and 43b and the pair of retainer ribs 43c and 43d may preferably be longitudinally symmetrically formed so as to extend along the modified first wood member 10E. The retainer ribs 43a, 43b, 43c and 43d thus arranged may function to combine the modified first horizontal substrate portion 21E and the modified tray wall portion 8E with the modified first wood member 10E, so as to reinforce the tray bottom portion 6.

Figure 17:
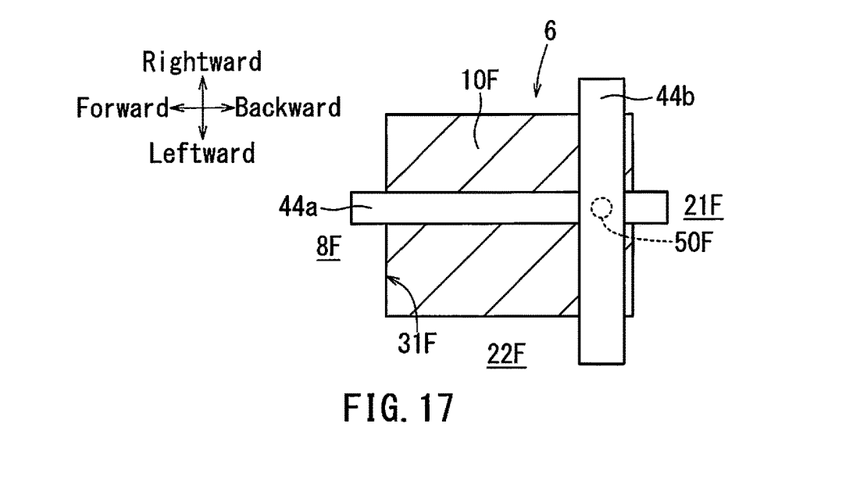
FIG. 17 is a partially plan view of a battery tray according to a eighth modified form, in which a resin substrate has ribs that are different from the ribs formed in the resin substrate of the embodiment.

As shown in FIG. 17, in an eighth modified form, the first wood member 10, the first horizontal substrate portion 21, the second horizontal substrate portion 22 and the tray wall portion 8 may respectively be replaced with a modified first wood member 10F, a modified first horizontal substrate portion 21F, a modified second horizontal substrate portion 22F and a modified tray wall portion 8F. The modified first wood member 10F, the modified first horizontal substrate portion 21F, the modified second horizontal substrate portion 22F and the modified tray wall portion 8F may be integrated with each other via a modified first connecting portion 31F. Further, the modified first horizontal substrate portion 21F, the modified second horizontal substrate portion 22F and the modified tray wall portion 8F may have a pair of retainer ribs 44a and 44b in place of or in addition to the first and second retainer ribs 40 and 41. The pair of retainer ribs 44a and 44b may preferably be formed so as to extend along the modified first wood member 10F. In particular, the pair of retainer ribs 44a and 44b may be formed in a cross shape so as to respectively extend over the entire length and width of the modified first wood member 10F. The retainer ribs 44a and 44b thus arranged may function to combine the modified first horizontal substrate portion 21F, the modified second horizontal substrate portion 22F and the modified tray wall portion 8F with the modified first wood member 10F, so as to reinforce the tray bottom portion 6. Further, the pair of retainer ribs 44a and 44b may have an anchor portion 50F as necessary. The anchor portion 50F may preferably be positioned in an intersection point of the pair of retainer ribs 44a and 44b. The anchor portion 50F may preferably penetrate the first modified wood member 10 in its thickness direction.

Further, in the tray bottom portion 6 of the embodiment, the horizontal substrate portions 21 and 22 (the resin substrate) and the first to third wood members 10, 11 and 12 (the wood insert) are specially shaped and arranged as above. However, the first and second horizontal substrate portions 21 and 22 and the first to third wood members 10, 11 and 12 may be changed in shape, size, number and arrangement as necessary. For example, in the embodiment, the first to third wood members 10, 11 and 12 are positioned in the battery holding portion 6a. However, the first to third wood members 10, 11 and 12 may be positioned so as to straddle the battery holding portion 6a and the battery guiding portion 6b. Further, in the embodiment, each of the first to third wood members 10, 11 and 12 is formed of the plate-shaped wood member having a uniform thickness. However, each of the first to third wood members 10, 11 and 12 may be formed of a plate-shaped wood member having a non-uniform thickness.

Further, in the embodiment, the tray wall portion 8 is formed as a portion of the resin substrate. That is, the tray wall portion 8 is formed as the solid wall portion that does not include the wood insert (wood members). However, the tray wall portion 8 may include the wood insert embedded therein. That is, the tray wall portion 8 may be formed as the composite wall portion.

Further, the anchor portions 50 and 51 formed in the first and second retainer ribs 40 and 41 may be changed in shape, size, number and arrangement as necessary. For example, in the embodiment, the anchor portions 50 and 51 are formed as penetrating projections that penetrate the wood members 10, 11 and 12 in the thickness direction. However, the anchor portions 50 and 51 may be formed as non-penetrating projections that do not penetrate the wood members 10, 11 and 12 in the thickness direction. That is, the anchor portions 50 and 51 may be formed as non-penetrating projections. Further, the anchor portions 50 and 51 may be used in combination with additional anchor portions, e.g., the modified anchor portions 51A and 51B. Naturally, the anchor portions 50 and 51 may be omitted as necessary.

Further, the first to third retainer ribs 40, 41 and 42 formed in the resin substrate may be changed in shape, size, number and arrangement as necessary. Further, the first to third retainer ribs 40, 41 and 42 may be used in combination with additional ribs, e.g., the retainer ribs 43a, 43b, 43c and 43d and/or the retainer ribs 44a and 44b in the modified forms. Naturally, the first to third retainer ribs 40, 41 and 42 may be partially or completely omitted as necessary.

Further, in the embodiment, the battery tray 2 is exemplified as the molded article. However, an instrument panel, a pillar garnish, a console and a door trim may be exemplified as the molded article other than the battery tray 2.

Further, in the manufacturing method of the battery tray 2, the pins are used as the temporarily holding devices 16m. However, various types of wires and hooks and suction devices may be used as the temporarily holding devices 16m. Further, in the manufacturing method, the temporarily holding devices 16m are formed in the inner surface 11s of the first die 11m. However, the temporarily holding devices 16m may be formed in the inner surface 12s of the second die 12m. Naturally, the temporarily holding devices 16m may be omitted as necessary.

A representative example of the present disclosure has been described in detail with reference to the attached drawings. This detailed description is merely intended to teach a person of skill in the art further details for practicing preferred aspects of the present disclosure and is not intended to limit the scope of the disclosure. Only the claims define the scope of the claimed disclosure. Therefore, combinations of features and steps disclosed in the foregoing detailed description may not be necessary to practice the disclosure in the broadest sense, and are instead taught merely to particularly describe detailed representative examples of the disclosure. Moreover, the various features taught in this specification may be combined in ways that are not specifically enumerated in order to obtain additional useful embodiments of the present disclosure.

What is claimed is:

1. A molded article comprising:
   a composite wall portion that is composed of a resin substrate and a wood insert embedded in a portion of the resin substrate,
   wherein the wood insert is configured such that its substantial portion extends to opposite surfaces of the resin substrate in a thickness direction, so that the portion of the resin substrate is completely replaced with the wood insert, and
   wherein the wood insert is integrated with the resin substrate in a boundary portion defined as a butt joining portion of an end surface of the wood insert and an end surface of the resin substrate with its inner and outer surfaces substantially exposed on inner and outer surfaces of the composite wall portion.

2. The molded article as described in claim 1, wherein a ratio of a thickness of the wood insert in its peripheral portion adjacent to the boundary portion to a thickness of the resin substrate in its peripheral portion adjacent to the boundary portion is determined to a range of not less than 0.7 or more.

3. The molded article as described in claim 2, wherein the wood insert is formed as a plate-shaped member having a substantially uniform thickness.

4. The molded article as described in claim 1, wherein the resin substrate has a plurality of ribs that are integrally formed therein, and wherein the plurality of ribs are configured to extend along the wood insert beyond the boundary portion at the inner surface of the composite wall portion.

5. The molded article as described in claim 4, wherein the resin substrate has anchor portions that are formed as projections projecting into the wood insert.

6. The molded article as described in claim 5, wherein the resin substrate has a plurality of additional ribs that are integrally formed therein, and wherein the plurality of additional ribs are configured to extend along the wood insert beyond the boundary portion at the outer surface of the composite wall portion.

7. The molded article as described in claim 6, wherein the anchor portions are formed in the plurality of ribs, and wherein the anchor portions penetrate the wood insert.

8. The molded article as described in claim 7, wherein the anchor portions are integrated with the plurality of additional ribs.

9. The molded article as described in claim 1 further comprising a solid wall portion that is composed of the resin substrate,
wherein the molded article is formed as a battery tray having a tray bottom portion corresponding to the composite wall portion and a tray wall portion corresponding to the solid wall portion.

10. The molded article as described in claim 1, wherein the wood insert has an anchor device formed in and along the end surface thereof, wherein the anchor device is formed as a wedge-shaped engagement projection.

11. The molded article as described in claim 1, wherein the wood insert has an anchor device formed in and along the end surface thereof, wherein the anchor device is formed as a recess having a V-shape in vertical cross section.

12. The molded article as described in claim 1, wherein the wood insert has an anchor device formed in and along the end surface thereof, wherein the anchor device is formed as an oblique surface.

13. The molded article as described in claim 1, wherein the wood insert has an anchor device formed in and along the end surface thereof, wherein the anchor device is formed as a projection having a T-shape in transverse cross section.

14. A manufacturing method of manufacturing the molded article of claim 1, comprising the steps of:
providing a molding die unit having a first die and a second die;
attaching the wood insert to the first die in a condition in which the molding die unit is opened;
closing the molding die unit in order to form a molding cavity having a first cavity portion in which the resin substrate is molded and a second cavity portion in which the wood insert is previously positioned; and
injecting a molding material into the first cavity portion, so as to mold the resin substrate and to combine the molded resin substrate with the wood insert in a cavity boundary corresponding to an end surface of the wood insert,
wherein a ratio of a thickness of the wood insert in its peripheral portion to a predetermined thickness of the resin substrate to be molded in its peripheral portion is determined to a range of not less than 0.8 or more.

15. The manufacturing method as described in claim 14, wherein the wood insert is attached to the first die by a plurality of temporarily holding devices formed in an inner surface of the first die.

* * * * *